United States Patent [19]

Sigrud et al.

[11] 3,852,854

[45] Dec. 10, 1974

[54] GIRT BAR LATCHING SYSTEM

[75] Inventors: Donald L. Sigrud, Granada Hills; Carleton M. Fields, Canoga Park; Ernest R. Rickel, Northridge, all of Calif.; Joseph A. Cline, Rimon-Kiryat Ono, Israel

[73] Assignee: Lockheed Aircraft Corporation, Burbank, Calif.

[22] Filed: Apr. 5, 1973

[21] Appl. No.: 348,234

[52] U.S. Cl....... 24/230 AT, 24/230 AU, 193/25 R, 244/137 P, 292/259
[51] Int. Cl...................... A44b 11/25, A44b 13/00
[58] Field of Search................. 24/230 AU, 230 AT; 193/25 R, 25 A, 25 B, 25 C; 292/259; 244/137 P

[56] References Cited
UNITED STATES PATENTS

| | | | |
|---|---|---|---|
| 1,384,001 | 7/1921 | Splittstoesser................. | 24/230 AT |
| 3,397,432 | 8/1968 | Banas........................... | 24/230 AU |

FOREIGN PATENTS OR APPLICATIONS

| | | | |
|---|---|---|---|
| 1,434,550 | 2/1966 | France............................ | 244/137 P |
| 326,459 | 5/1935 | Italy................................ | 24/230 AT |

Primary Examiner—Bernard A. Gelak
Attorney, Agent, or Firm—Billy G. Corber; Frank L. Zugelter

[57] ABSTRACT

A girt bar latching system for operating the deployment of an evauation slide or combination slideraft in event of an emergency, and in normal mode of operation to latch and release its girt bar from floor fittings when the exit door is closed and opened, respectively. An inflatable but collapsed and packed slide is stored in a container mounted upon the interior side of the exit door, and is utilized in emergency situations only. In normal operation, as the door closes, the end portions of a girt bar connected to the slide engage the floor fittings. Upon opening the door, latches included in the floor fittings are depressed thereby providing for release of the girt bar so that it travels with the slide, container, and door. In an emergency mode of operation, as the door is opened, the latches remain raised to prevent the girt bar from releasing from the floor fittings. The girt bar is retained in the floor fittings as the escape slide or raft deploys. An arming mechanism is employed for selection of normal and emergency operational modes.

11 Claims, 6 Drawing Figures

GIRT BAR LATCHING SYSTEM

BACKGROUND OF THE INVENTION

1. Field of the Invention

The field of art to which the invention is most likely to pertain is located in a class of devices generally relating to girt bars and escape slides.

2. The Prior Art

Examples of prior art devices in the arts to which this invention most likely pertains are U.S. letters Pat. Nos. 3,634,914; 3,554,344; 3,463,287; 3,102,623; 3,018,867, 2,765,131; and 2,426,221.

PROBLEMS IN THE PRIOR ART

Although similar equipment is considered standard and required on commercial air carriers, known previous systems provide a high profile for girt bar securing units disposed on the floor of an aircraft. Injury or damage to passengers or their wearing apparel, such as shoes, would occur as they would embark onto or debark from the aircraft. Maintenance personnel working interiorly of the aircraft are exposed to possible injury, or otherwise damage the floor fittings. Furthermore, existing floor mounted equipment of this type lacks an aesthetic desirability in the interior aircraft decor, much sought after by passenger airlines.

This invention provides a low profile to the latching devices and a high reliability to the system to which complete accessibility may be had for maintenance purposes. The latching units themselves are flush with the floor. Damage to the units and injury to working personnel are eliminated. An aesthetic appearance to passengers who pass over or by such units is achieved.

SUMMARY OF THE INVENTION

An object of this invention is to selectively retain or release an escape slide girt bar to and from latchiny mechanisms, depending upon whether a normal or emergency mode of operation is to be carried out.

Another object of this invention is to obviate the occurrence of tripping by passengers embarking upon or debarking from the aircraft, by providing a low profile to the latching devices or floor fittings of a girt bar latching system.

A further object of this invention is to achieve an aesthetic appearance for the floor fitting unit as distinguished from presently exposed girt bar units found in modern-day commercial aircraft.

Another object of this invention is to provide a visual indication of an armed condition for the system.

A still further object of this invention is to provide an efficient, simplified and reliable girt bar latching system.

These and other objects and advantages will become more apparent upon a full and complete reading of the following description, the appended claims thereto, and the accompanying drawing comprising two sheets.

DESCRIPTION OF THE PREFERRED EMBODIMENT

Figure 1:
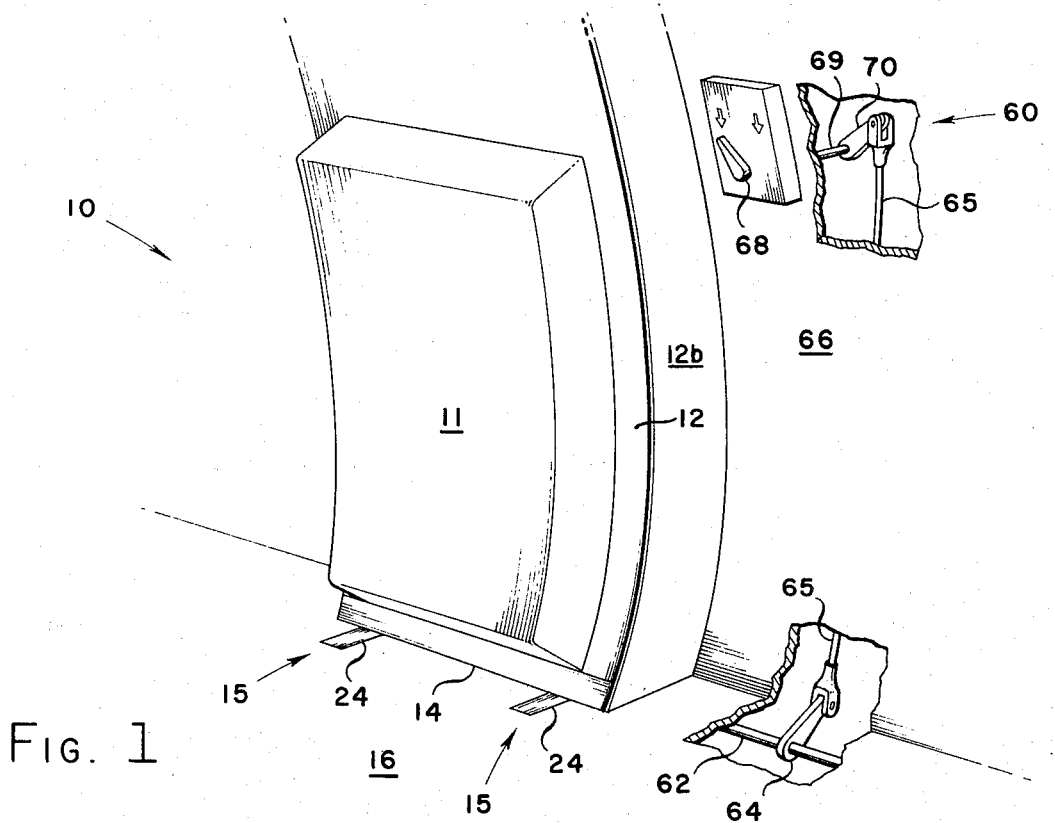
FIG. 1 is a perspective view of an aircraft cabin's interior when facing its doorway and illustrating the cabin door and the controls for the girt bar latch of this invention.
Figure 6:
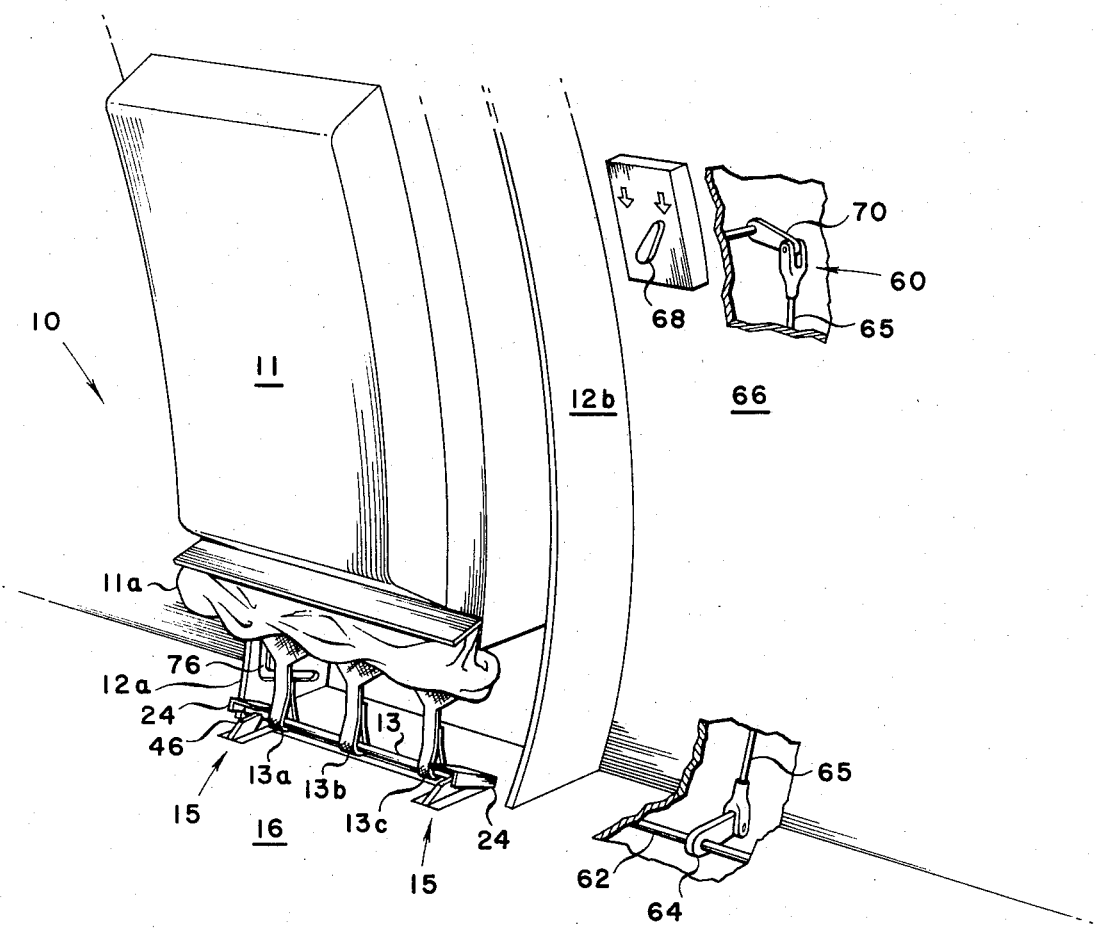
FIG. 6 is a view of the cabin door similar to FIG. 1, but showing the girt bar latched and a slide partially withdrawn from the door.

Referring now to the drawing in which reference characters correspond to like numerals hereinafter, reference character 10 (FIG. 1) describes generally the area of an aircraft cabin's interior at which the girt bar latching system of this invention is located. An evacuation escape slide 11a (FIG. 6) is collapsed or in deflated condition for storing in a container 11 suitably mounted on the interior side of a door 12 provided for emergency evacuation of passengers and crew as well as loading and unloading of passengers, crew and supplies. The door 12 is disposed between guide partitions 12a and 12b. A girt bar 13 (FIGS. 2, 3, 4) is securely mounted to a fabric tie member or members 13a, b and c, as shown in FIG. 6, forming a part of the escape slide itself. The girt bar 13 is situated at the base of the container 11, under door trim 14, and generally straddles the width of the container 11 in order to cooperatively relate to a pair of floor fittings or latching units 15 suitably secured at their respective stations to the floor 16 in spaced relation to each other.

Figure 2:
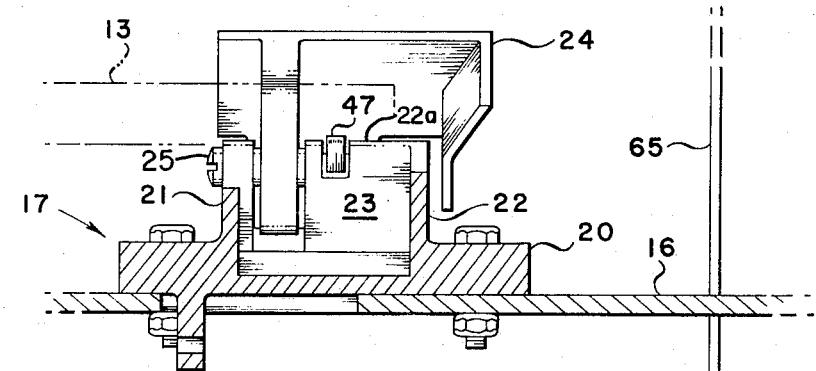
FIG. 2 is an elevational view of a floor fitting, partly in section as taken along line 2—2 of FIG. 4, and underfloor adjuncts thereto, for latching onto and releasing therefrom a girt bar.
Figure 3:
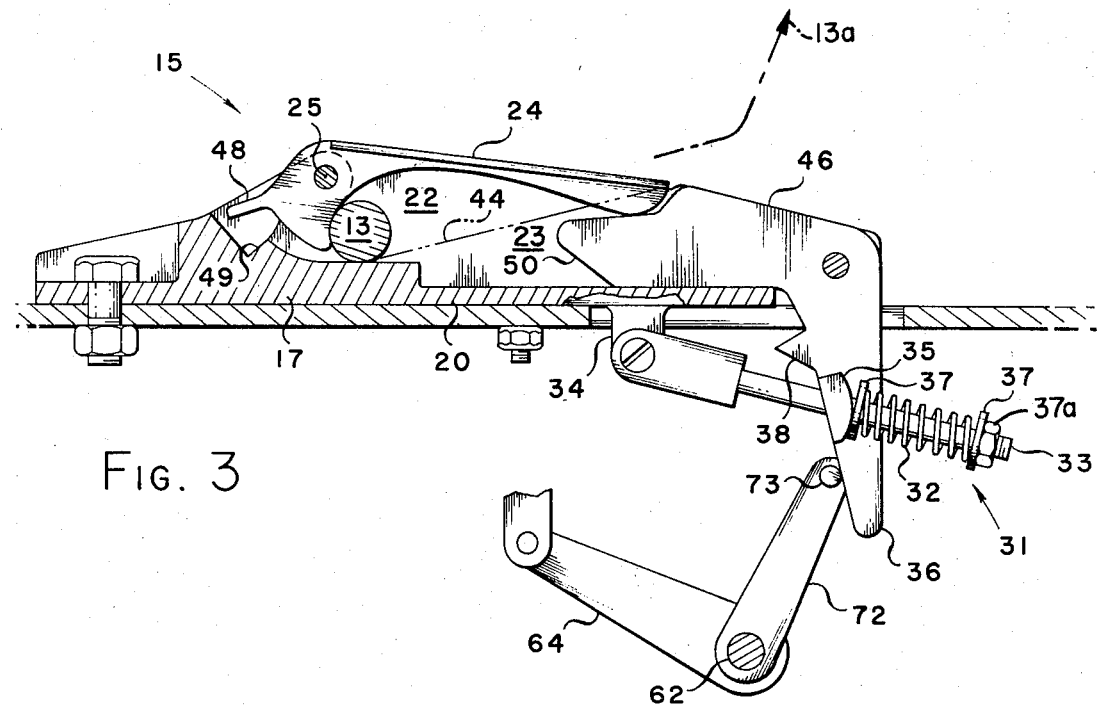
FIG. 3 is a side elevational view of the floor fitting with its latch member in depressed position and an end portion of a girt bar in a cavity formed in the fitting.

As shown in FIGS. 2–5, each latching unit or device 15 comprises a fitting 17, preferably cast, having a base 20 and spaced side walls 21, 22 which extend upwardly from the base 20 so as to form a cavity 23 FIGS. 2 and 3. An end wall 22a extends upward from the base 20 and inward from the side wall 22 to partially close one end of and better define the cavity 23. A cover member 24 is pivotally mounted, as by a pin member 25, in a casting wall 26 forming a portion of the side wall 21, and in the end wall 22a, along an axis through the end wall 22a and behind the formed cavity 23 to provide a closure therefor. A latch member 27, oriented longitudinally of and in a plane vertical to the base 20, is rotatably mounted at the forward end of the fitting 17, as at 28, and between the side walls 21, 22. The latch member 27 includes a biased keeper bar 29 which faces the cavity 23 and has a tip 30 engaging the cover member 24 when the bar 29 is in the biased position in order to maintain the closure member 24 in an upward pivoted or capturing position. The keeper bar 29 is biased as at 31 (FIGS. 3, 4), upwardly. The biasing means 31 for the latch member 27 or its keeper bar 29 comprises a coiled spring 32 mounted about a rod 33 having its one end suitably pivotally connected to a depending lug 34 integrally formed to the base 20. The rod extends through an apertured projection 35 laterally formed on an actuator member 36 for the keeper bar 29. The coiled spring 32 is retained between the other end of its rod 33 and the projection 35 by suitable means such as washers 37 and a nut 37a suitably mounted on the rod 33. The spring 32 urges the projection 35 in a direction raising the keeper bar 29 to contact with the cover member 24. A stop 38 is provided on the member 36 to limit the upward travel of the keeper bar 29 by its engagement with the base 20.

Figure 4:
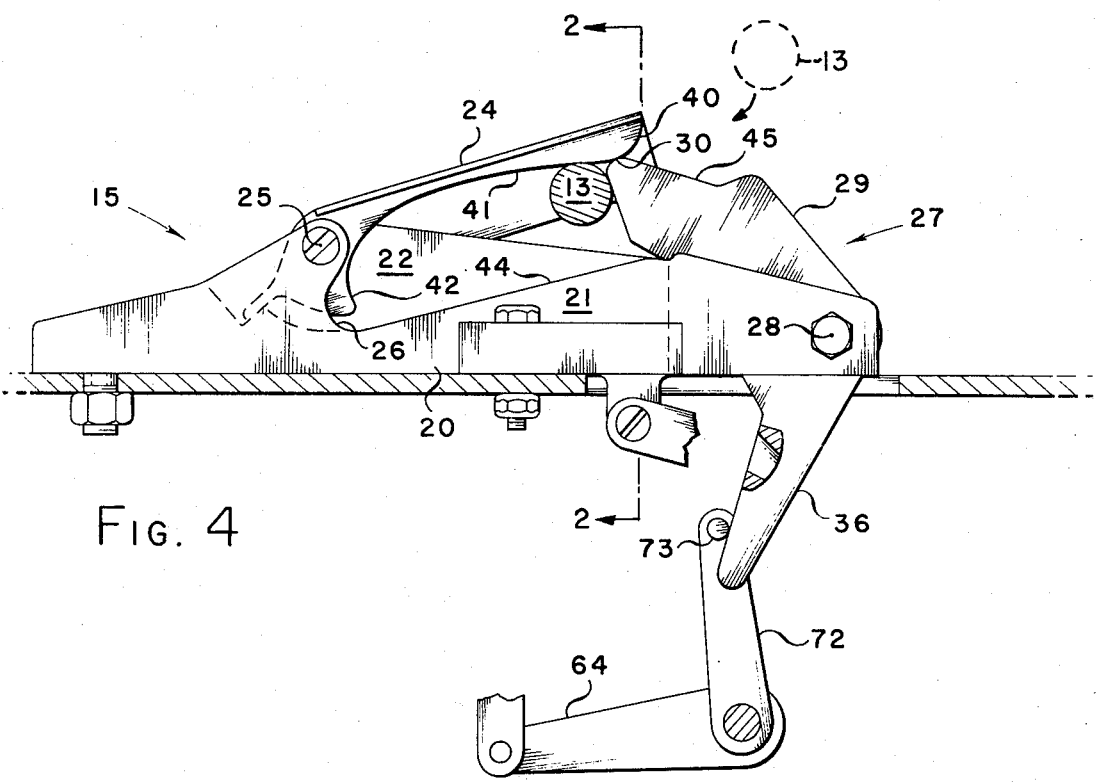
FIG. 4 is a side elevational view of the floor fitting with its latch member in raised position thereby preventing the release of the end portion of the girt bar from its cavity in the fitting.
Figure 5:
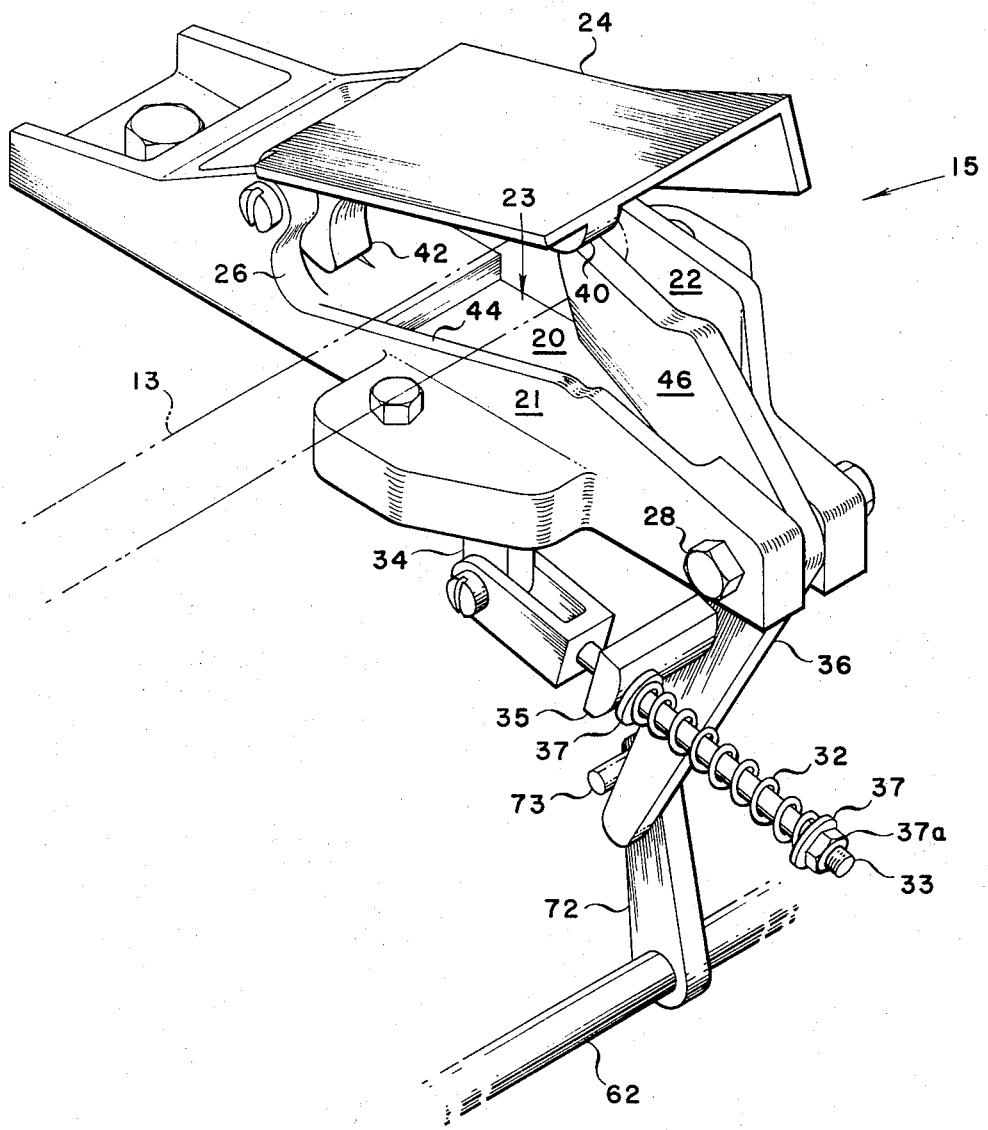
FIG. 5 is a perspective view of the fitting in the FIG. 4 position.

A lip 40 (FIGS. 4 and 5) is formed on the underside of the cover member 24 and in alignment with the keeper bar 29. The lip 40 emerges into a camming surface 41 which extends towards the pivot 25 to terminate in a trigger 42 disposed below the pivot 25. The trigger 42 is adapted to lie flush (FIG. 3) with or slightly behind the casting wall 26 upon closing of the cover member 24 but projects forwardly of such wall 26 upon the cover member 24 being raised (FIG. 4). The side wall 21 is partially relieved so as to form a notch 44 for entry of a corresponding end portion of the girt bar 13 to the cavity 23.

A relief 45 is provided along an upper edge of the keeper bar 29 to provide a flush lie of the cover member 24 with the remaining edge portion 46 (FIG. 3) of the keeper bar 29. A biasing means, such as a leaf spring 47 (FIG. 2), may be suitably mounted about the pivot 25 to bias the cover member 24 in a direction tending to cause it to lie flush. A finger 48 is included at the rear of the cover member 24 for engaging a bearing surface 49 in the casting 17, thereby limiting the extent of upward rotation of the cover member 24.

A bearing surface 50 is provided for the keeper bar 29 and is angularly referenced to a vertical plane passing through the tip 30 of the keeper bar 29 in its raised position. The purpose of this is to eliminate any downward acting (vector) force on the latch member 27 when the end portion of the girt bar 13 locks against such bearing surface 50 and the camming surface 41, as shown in FIG. 4 and during operation. Otherwise, the force acting through the bearing point between the girt bar 13 and the bearing surface 50 could produce a downward acting vertical component of force that possibly could be of a sufficient magnitude to rotate the latch member 27 out of its raised position and thereby have the girt bar 13 release prematurely.

A mechanism 60 (FIGS. 1, 2) is provided to arm the system and the latching units 15 for an emergency mode of operation. A rotatable shaft 62 is disposed below the floor 16 in a direction generally parallel to the length of the girt bar 13. Each end of the shaft 62 is mounted on a suitable spherical bearing (not shown) to any suitable supporting structure. One end of a lever 64 is secured to the rotatable shaft 62 while its other end is pivotally attached to a suitable push-pull rod 65, or other means which perform the same function. The push-pull rod 65 extends vertically upwardly behind the wall 66 forming the cabin. A selector lever 68 is rotatably mounted interiorly upon the wall 66 for operative connection to the push-pull rod 65. The selector lever 68 is securely mounted to one end of a rod 69 on the other end of which one end of a lever 70 is secured while its other end is pivotally attached to the push-pull rod 65. It should now be apparent that as the selector lever 68 rotates from one of two positions to the other, through the various linkages just described, the rotatable shaft 62 is caused to rotate through an angle about its own axis.

An actuating lever 72 for the actuator member 36 to the latch member 27 is secured to the shaft 62 to position a pin 73 laterally extending from adjacent its free end in sliding engagement with the edge of the actuator member 36. Thus, depending upon the direction of rotation of the shaft 62, the actuating lever 72 rotates, thereby either forcing the pin 73 to rotate the actuating member 36 against the spring force of the biasing means 31 or to arcuately remove the pin 73 away from the actuator member 36 to cause the biasing means 31 once again to elevate the keeper bar 29.

OPERATION

Normal Operating Mode. The door 12 is actuated to open by means not a part of this invention. In opening it moves normal to and inwardly or interiorly of the cabin wall 66 along the tracks 74 (FIG. 6) from its sealed position. In so doing, the girt bar 13 also moves in a direction normal to the cabin wall 66, as it is operatively tied to the slide system 11a disposed in the container 11 mounted on the door 12. The end portions of the girt bar 13 contained in the cavities 23 of each floor fitting 17 also move interiorly of the cabin wall 66. The keeper bars 29 must be depressed prior to initiating opening of the door 12 in order that such end portions pass over their keeper bars 29 so that the girt bar 13, its tied-in escape slide 11a, and the container 11 stay with the door 12 as the latter rolls up to and along the ceiling of the fuselage. To provide a depressed position for the keeper bars 29, the actuator member or arm 36 for the latch member 27 is caused to rotate by means of the selector lever 68 being moved to one of its two positions and which unarms the mechanism 60. Through this operation of unarming the mechanism 60, each latch member 27 is caused to be depressed. Thus, the ends of the girt bar 13 can ride up their respective notches 44 and simply flip up the cover member 24 to ride free of and be released from the cavities 23 as the door 12 begins to open by moving inwardly and upwardly. With the door 12 and the girt bar 13 in elevated position, the cover member 24 seeks its lowest profile (FIG. 3), one which prevents tripping by a passenger as he embarks or debarks the aircraft, or while maintenance personnel are working in the area. The positive bias of the leaf spring 47 assists in this advantageous accomplishment.

Upon closing of the door 12, the cover member 24 must be placed in its raised position by means of the keeper bar 29 in order for the end portions of the girt bar 13 to be seated in their corresponding cavities 23 of the floor fittings 17 as the door is caused to close. The latch member 27 is put into its biased position by rotating the selector lever 68 to position illustrated in FIG. 6. The shaft 62 rotates the lever 72 and pin 73 away from the actuator member 36, and the latch member 27 is raised against the cover member 24. As the door 12 is caused to move downwardly towards a closed position, the girt bar 13 first engages the relief 45 (FIG. 4), and thereafter as the door 12 is moved outwardly to seal with the cabin wall 66, the ends of the girt bar 13 engage the lip 40. The girt also contacts the relief 45 of the keeper bar 29, causing the latter to pivot about the axis at 28 and thereby compressing the spring 32, allowing the girt bar 13 to cam onto the surface 41 as the door moves outwardly. The lips 40 capture the end portions of the girt bar 13 to assist their motions towards their corresponding cavities 23 as the door moves outwardly. During normal flying mode, the latch members 27 remain in their biased raised position, as the mechanism 60 is armed. The door trim 14 mounted along the base of the door 12 conceals a substantial part of the cover member 24 of each of the floor fittings 17 from passenger view, while the girt bar latching system remains in an armed condition in the event of an emergency.

Emergency Mode of Operation In the event that an emergency situation arises, there is no need for the latch members 27 to be repositioned in order to retain the end portions of the girt bar 13 in their corresponding cavities 23. In the mode of operation, when the door is caused to be opened, the girt bar 13 remains in the cavities 23 of their floor fitting 17. As the door goes up to the ceiling of the fuselage, the door trim 14 is deflected and the escape slide 11a is thus pulled from its container 11 as the door opens, substantially as illustrated in FIG. 6. Whenever the end portions of the girt bar 13 engage their corresponding triggers 42, and with augmentation from a deployed slide and the weight of evacuees and the impact therefrom on the escape slide, the cover member 24 is rotated tightly against or down on the keeper bar 29 which is forced into its depressed position. The trigger 42 becomes flush with the casting wall 26 in order to transmit forces directly into the fitting 17. The slide is caused to deploy while being supported by the girt bar held within the floor fittings. A description of the manner of deployment and inflation of the collapsed slide is not necessary to an understanding and practice of this invention.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what we claim as patentably novel is:

1. A girt bar latching system for a deployable escape chute assembly utilized under evacuation procedures associated with a closed structure such as an aircraft cabin or the like, comprising:
   a girt bar having opposing end portions and having a length adapted to be operatively connected to an escape chute collapsed within a container mounted on the interior side of an exit door for the closed structure or the like, the girt bar generally disposed at the base of the container;
   at least a pair of latching units adapted to be secured to the floor of the closed structure at a station at which a corresponding one of the end portions of the girt bar can engage and be latched to its corresponding one of said units;
   each of said units defining a cavity and a notch into each of which a corresponding one of said end portions is introduced upon closing of the door;
   a member covering the cavity and being pivotally connected to each of said units;
   a latch member rotatably mounted on each of said units and facing the cavity and towards said covering member, said latch member being biased upwardly to engage and maintain said covering member in a raised position; and
   means for actuating said latch member against its bias to depress it below said notch for each of said latching units whereby the end portions of said girt bar can be released from said latching units.

2. The system of claim 1 wherein said actuating means comprises a member extending below each of said units and being pivotal with said latch member.

3. The system of claim 2 including an arming mechanism for positioning said latch member in its biased or raised position.

4. The system of claim 3 wherein said arming mechanism comprises:
   a rotatable shaft suitably mounted below said latching units in general parallel alignment to said girt bar;
   a selector lever operatively connected to said rotatable shaft for rotating said shaft from a first to a second position;
   lever means secured to said shaft and engaging said pivotal member;
   the rotation of said shaft from its first to second position causing said lever means to drive said pivotal member against the bias of said latch member to depress it below said notch.

5. A latching device comprising in combination:
   a fitting adapted to be secured to a floor or the like;
   means defining a cavity formed longitudinally of said fitting;
   a member pivotally connected to said fitting for covering such cavity;
   means defining a notch for providing sideway entry to the cavity for an end portion of a bar or the like, said notch defining means being formed longitudinally of said fitting;
   a latch member pivotally mounted on said fitting and facing said cavity and covering member;
   means biasing said latch member to engage and maintain said covering member in a raised position, said latch member being depressible against said biasing means;
   whereby said covering member captures the end portion of a bar as it passes over said latch member into the cavity.

6. The device of claim 5 including:
   a lip on said covering member;
   a camming surface emerging from said lip and extending towards the pivot connection for said covering member; and
   means depending from said covering member below its pivot connection and against which the end portion of the bar or the like is adapted to make contact.

7. The device of claim 5 wherein said latch member includes:
   a keeper bar;
   means on said keeper bar for engaging said covering member; and
   a bearing surface on said keeper bar and against which the end portion of the bar can bear without the bar being released from said latching device.

8. The device of claim 5 including an actuating member for said latch member.

9. The device of claim 8 wherein said actuating member comprises an arm having its pivot connection integral with that of said latch member.

10. The device of claim 9 wherein said biasing means is operatively connected between said device and arm.

11. The device of claim 10 wherein said biasing means comprises a coiled spring-and-rod arrangement pivotally mounted about said fitting and urging said arm in a direction raising said latch member.

* * * * *